May 17, 1938.  W. J. ROBINSON ET AL  2,117,452
CUT SEAMING MACHINE
Filed Sept. 8, 1932
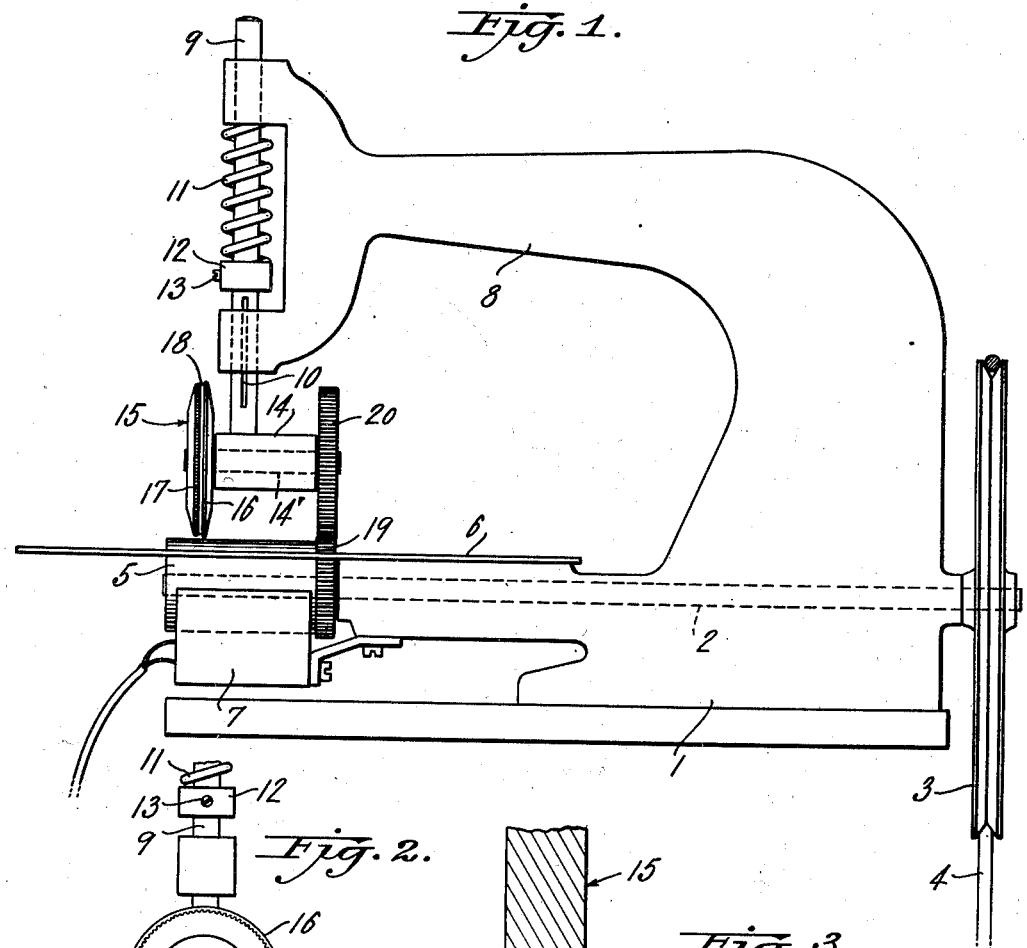
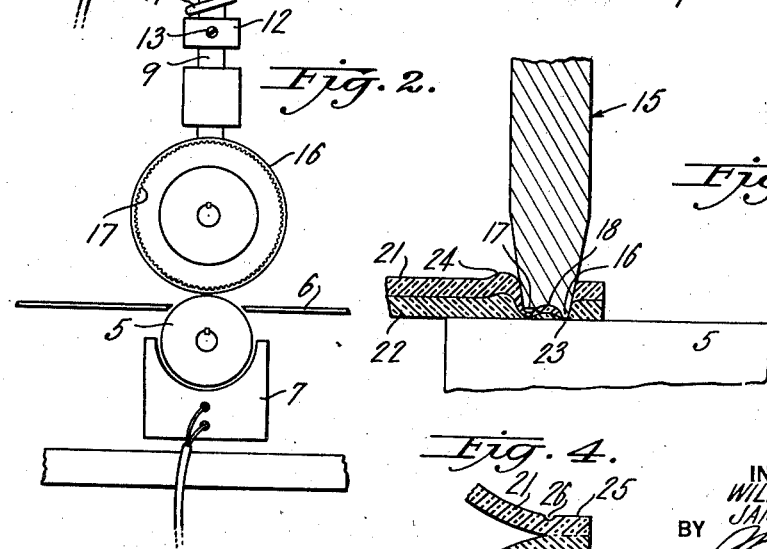
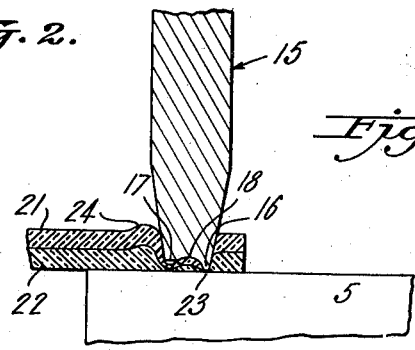
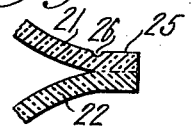
INVENTORS
WILLIAM J. ROBINSON
JAMES J. GALLIGAN
BY
ATTORNEY Patented May 17, 1938

2,117,452

UNITED STATES PATENT OFFICE 2,117,452

CUT SEAMING MACHINE

William J. Robinson and James J. Galligan, Providence, R. I., assignors, by mesne assignments, to United States Rubber Company, New York, N. Y., a corporation of New Jersey Application September 8, 1932, Serial No. 632,182

4 Claims. (Cl. 154—42)

This invention relates to a cut seaming machine for cutting through superposed plies of rubber stock and simultaneously uniting the plies at the cut edge, more particularly to a cut seaming machine for uniting heavy gauge stock.

For many years in the rubber industry superposed plies of light gauge rubber stock have been cut seamed together, as by the use of a small severing wheel which cuts through the superposed plies of stock and also, due to its pressure on the stock adjacent the cutting point, unites the plies adjacent the cutting point, the surfaces of the rubber stocks being sufficiently tacky to unite under such pressure. However, this pressure from the cutting wheel is exerted only immediately adjacent the cutting point, and as a result this method of cut seaming together superposed plies of stock has been applicable only in the case of the lighter gauges of stock such as those thinner than .020 inch. Such stocks are used for the making of bath caps, aprons, baby pants, and similar articles of thin sheet rubber.

An object of the present invention is to provide an apparatus for cut seaming superposed plies of relatively heavy rubber stock.

Another object is to provide a cut seaming apparatus in which the seaming operation is aided by the application of heat at the seaming point.

Another object is to provide a cut seaming apparatus in which a uniting pressure, in addition to that exerted by the cutting edge, is applied to the superposed plies of stock adjacent to the cutting point.

Other objects will appear from the detailed description and drawing, in which latter:

Fig. 1 shows the machine of my invention in side elevation;

Fig. 2 is a broken front view of the machine;

Fig. 3 is an enlarged detail illustrating approximately the manner in which the seaming operation is carried out; and Fig. 4 is a broken section illustrating the seamed together rubber plies.

Referring to the drawing, the numeral 1 designates the frame of the machine, in the lower part of which is journaled a shaft 2, which may be driven in any suitable manner as by the pulley 3 and belt 4. At the inner end of the shaft is mounted a roll 5, which in cooperation with the seaming wheel, to be later described, acts to cut seam the superposed plies of rubber stock and to feed them. The feed roll 5 is arranged to project slightly above an opening in a work table 6 mounted on the main frame. While the machine may be used without the application of heat for cut seaming somewhat lighter gauges of stock, it operates better when heat is applied to the rubber at the seaming point, and in fact the application of such heat is practically essential when cut seaming very heavy stocks. As one manner of applying heat at the seaming point, the feed roll 5 may be heated, and in the present embodiment of the invention there is shown an electric heating element 7 which closely surrounds a considerable portion of the circumference of the roll 5.

The frame of the machine is provided with an overhanging arm 8, and mounted in a head at the end of the overhanging arm is a slide rod 9, rotation of which in the head is prevented by the key 10. The rod is resiliently pressed downwardly by the coil spring 11 held between the upper part of the head and the collar 12 adjustably mounted on the rod 9 by a set screw 13 or other suitable fastening. Carried at the lower end of the rod 9 is a bearing 14 in which is mounted the shaft 14' of the seaming wheel which latter is designated generally by the numeral 15. The seaming wheel is provided with a somewhat blunt cutting edge 16, which due to the pressure of the spring 11 resiliently cooperates with the feed roll 5 to press or cut through or substantially cut through the plies of rubber being operated upon. Spaced from the cutting edge 16 of the seaming wheel is a serrated compressing and uniting edge 17, which is of slightly less diameter than the seaming edge 16, and between the edges 16 and 17 the diameter of the seaming wheel is reduced still further to a slight extent as shown at 18.

While it is possible to feed the stock by positively driving only the feed roll 5 in the case of thinner stocks, there is a tendency for the stock to creep in such a manner that uneven edges result, and this is particularly marked in the case of heavier stocks. Therefore, in order to positively drive both the feed roll and the seaming wheel, a gear 19 is mounted on the shaft 2 in rear of the feed roll 5 and this gear meshes with a gear 20 mounted on the shaft 14' of the seaming wheel 15. It will be seen that by this construction both the feed roll 5 and the seaming wheel 15 are positively driven and at the same peripheral speed.

In operation the stocks to be united are brought into the bite of wheel 15 and roll 5, or the feed wheel is raised against the pressure of the spring 11 by a usual form of hand lever (not shown), and the superposed plies of stock 21 and 22 are inserted between the seaming wheel and feed roll. The seaming wheel is released so as to press on the top ply of stock, and the machine started. In Fig. 3 there is shown on an enlarged scale an approximation of the mode of operation of the machine. The cutting edge 16 of the wheel 15 cuts through or substantially through the two plies of stock so as to sever them at the point 23, and some of the stock in the area of the superposed plies beneath the portions 17 and 18 of the seaming wheel is forced outwardly into a bulge as shown at 24. However, the calendered rubber stock, while it has been rendered sufficiently plastic for manufacturing purposes by the milling and compounding operations, still retains a certain amount of elasticity, and due to the speed of the operation, the stock from beneath the portions 17 and 18 of the seaming wheel is not permanently displaced but springs back again when the plied stocks emerge from beneath the wheel. As a result the seamed together plies 21 and 22 appear substantially as shown in Fig. 4, the superposed plies at the point 25 being firmly united by the pressure from the portions 17 and 18 of the wheel 15, and at the point 26 a series of small indentations appear, due to the serrations from the edge 17.

The diameter of the reduced serrated edge 17 is preferably varied in accordance with the thickness of the stocks operated upon, the thicker the stocks the greater the reduction in diameter of the serrated edge.

While, as before stated, it is not essential to use heat in the seaming together of stocks which are not quite so heavy, it is practically impossible even with the present apparatus to satisfactorily seam together stocks more than .025 inch in thickness without the application of heat. The heater 7, due to its close proximity to the feed roll 5, heats the latter to a degree sufficient to further soften the already plastic rubber stock at the point where the latter is pressed tightly against the roll 5 by the seaming wheel 15, and in fact even the wheel 15 becomes quite warm when steadily operated. By the use of the seaming wheel 15 and the application of heat at the seaming point, it is possible to cut seam and unite very heavy gauge stocks. Due to the geared connection between the feed roll and the seaming wheel, the superposed stocks are uniformly fed without any tendency to creep or buckle.

The machine is capable of a wide variety of uses, and is particularly applicable in the cut seaming together of the sections of heavy gauge rubber play balls.

While a specific embodiment of the invention has been shown and described, it is obvious that modifications may be made within the scope of the appended claims, and it is not desired to limit the invention otherwise than as required by the prior art.

Having thus described our invention, what we claim and desire to protect by Letters Patent is:

1. An apparatus for cut seaming superposed plies of sheet rubber comprising a cylindrical roll, and a seaming wheel in resilient cooperation therewith, said roll being positioned below said seaming wheel and extending a substantial distance to both sides of the point of cooperation of said roll and wheel, said wheel having a severing edge and a compressing and uniting portion adjacent said edge, said portion having an outer edge of less diameter than said severing edge and intermediate portion between said edge and uniting portion being of still less diameter.

2. An apparatus for cut seaming superposed plies of sheet rubber comprising a cylindrical roll, and a seaming wheel in resilient cooperation therewith, said roll being positioned below said seaming wheel and extending a substantial distance to both sides of the point of cooperation of said roll and wheel, said wheel having a severing edge and a serrated compressing edge spaced from said severing edge and of less diameter.

3. An apparatus for cut seaming superposed plies of sheet rubber comprising a cylindrical roll, means for heating said roll, said roll being positioned below said seaming wheel and extending a substantial distance to both sides of the point of cooperation of said roll and wheel, a seaming wheel in resilient cooperation with said roll, said wheel having a severing edge and a serrated compressing edge spaced from said severing edge and of less diameter, and means for driving said roll and wheel at the same peripheral speed.

4. An apparatus for cut seaming superposed plies of sheet rubber comprising a cylindrical feed roll, a seaming wheel in resilient cooperation with said roll, said roll being positioned below said seaming wheel and extending a substantial distance to both sides of the point of cooperation of said roll and wheel, said wheel having a severing edge and a serrated compressing edge spaced from said severing edge and of less diameter, the portion of said wheel between said edges being of less diameter than either of them, means for driving said roll and wheel at the same peripheral speed, and means for applying heat to the rubber stock at the seaming point.

WILLIAM J. ROBINSON.
JAMES J. GALLIGAN.